(12) United States Patent
Livne et al.

(10) Patent No.: US 10,791,057 B2
(45) Date of Patent: Sep. 29, 2020

(54) TECHNIQUES FOR PACKET TRANSMIT SCHEDULING

(71) Applicant: Intel Corporation, Santa Clara, CA (US)

(72) Inventors: Sarig Livne, Schanya (IL); Ben-Zion Friedman, Jerusalem (IL); Ronen Aharon Hyatt, Haifa (IL); Nir Tiser, Hannaton (IL); Robert J. Munoz, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/175,734

(22) Filed: Oct. 30, 2018

(65) Prior Publication Data

US 2019/0068507 A1 Feb. 28, 2019

(51) Int. Cl.
*H04L 12/815* (2013.01)
*H04L 12/741* (2013.01)
*H04L 12/911* (2013.01)
*H04L 12/927* (2013.01)
*H04L 12/825* (2013.01)

(52) U.S. Cl.
CPC .............. *H04L 47/22* (2013.01); *H04L 45/74* (2013.01); *H04L 47/748* (2013.01); *H04L 47/80* (2013.01); *H04L 47/824* (2013.01); *H04L 47/25* (2013.01)

(58) Field of Classification Search
CPC ..... H04L 1/0041; H04L 5/0064; H04L 29/06; H04L 27/2602; H04L 47/22; H04L 45/74; H04L 47/748; H04H 60/73
See application file for complete search history.

(56) References Cited

U.S. PATENT DOCUMENTS

| | | | |
|---|---|---|---|
| 9,585,144 B1* | 2/2017 | Shaw ..................... | H04W 76/15 |
| 2005/0111381 A1* | 5/2005 | Mukherjee ......... | H04N 21/8455 370/254 |
| 2008/0225728 A1* | 9/2008 | Plamondon ............. | H04L 47/10 370/237 |
| 2008/0233967 A1* | 9/2008 | Montojo ............. | H04W 72/082 455/452.2 |
| 2012/0226804 A1* | 9/2012 | Raja ....................... | H04L 43/028 709/224 |
| 2018/0026884 A1* | 1/2018 | Nainar .................... | H04L 41/00 370/392 |
| 2018/0359520 A1* | 12/2018 | Takahashi ............ | H04N 21/438 |

\* cited by examiner

*Primary Examiner* — Michael J Moore, Jr.
(74) *Attorney, Agent, or Firm* — Compass IP Law PC

(57) ABSTRACT

Techniques to schedule transmission of a packet from a computing platform include calculating adjustments to portions of the packet to cause corrections to at least one portion of the packet. An adjustment to a scheduled transmission of the packet is made based on the corrections.

22 Claims, 11 Drawing Sheets

Table 400

| Operator ID | Protocol Priorities | | | | Offset & Packet Structure Recipe |
|---|---|---|---|---|---|
| | Data Priority Rank | MAC Priority Rank | Network Priority Rank | Transport Priority Rank | |
| 401-1 | 1 | 3 | 4 | 2 | 405 |
| 401-2 | 4 | 1 | 2 | 3 | 410 |
| ... | ... | ... | ... | ... | ... |
| 401-n | 3 | 1 | 2 | 4 | 415 |
| Default | 1 | 2 | 3 | 4 | 420 |

*FIG. 4*

IPG Table 500

| Port ID | IPG (Bytes) |
|---------|-------------|
| 501-1   | 5           |
| 501-2   | 8           |
| 501-3   | 1           |
| 501-4   | 12          |
| 501-5   | 8           |
| 501-6   | 12          |
| ...     | ...         |
| 501-m   | 5           |

*FIG. 5*

Scheme 700
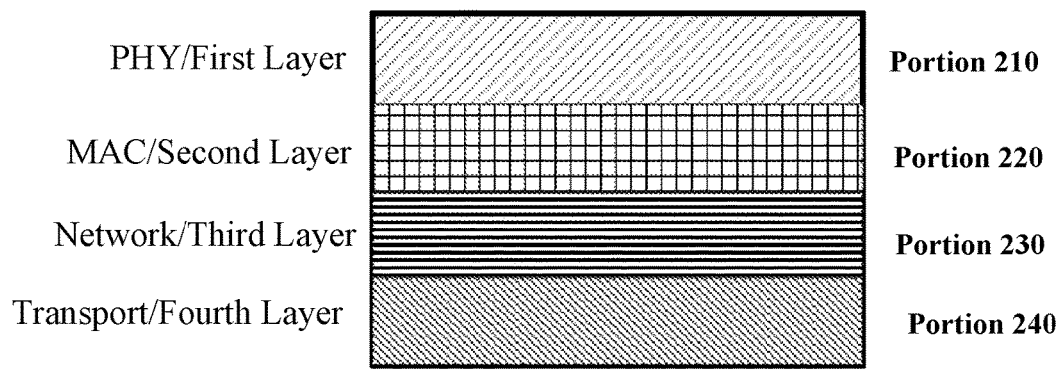
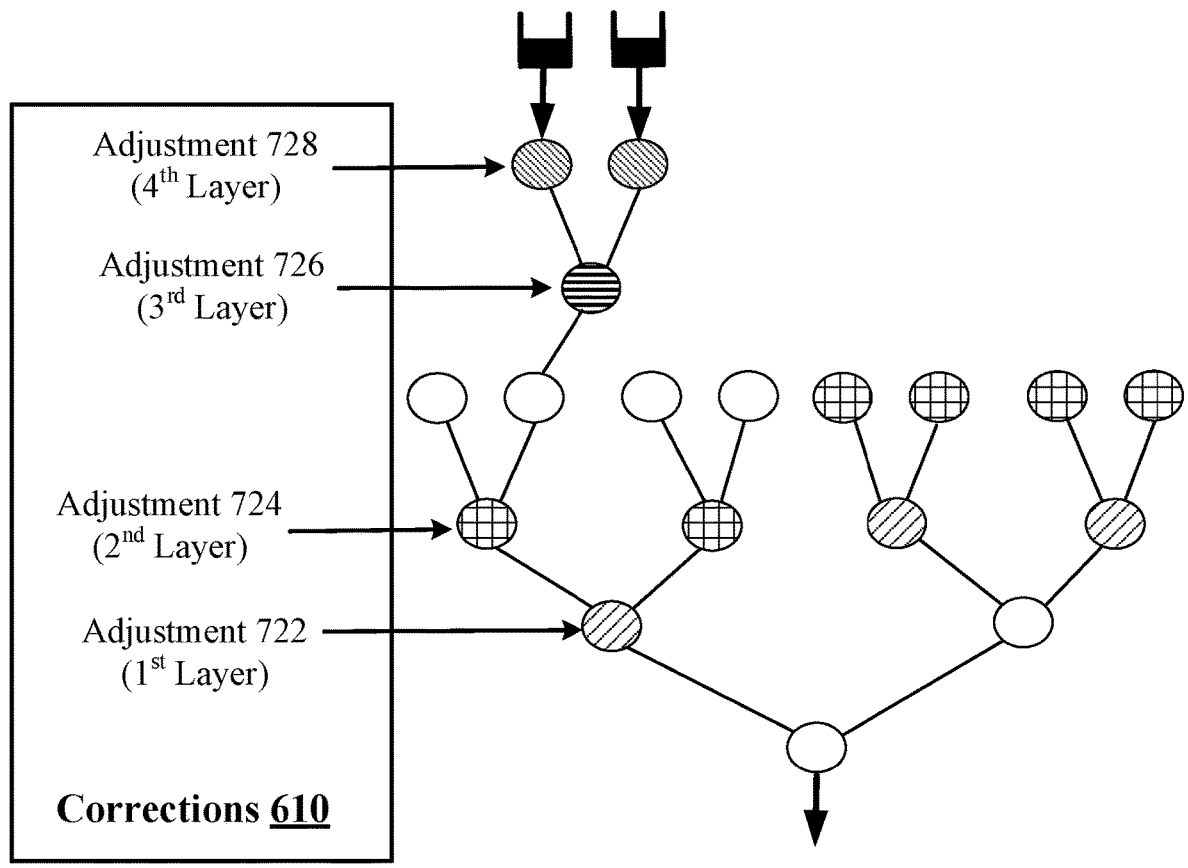
*FIG. 7*

900

```
SCHEDULE TRANSMISSION OF A PACKET FROM A COMPUTING PLATFORM
902
          │
RECEIVE PACKET METADATA FOR THE PACKET
904
          │
IDENTIFY PROTOCOLS AND RESPECTIVE OFFSETS OF THE PROTOCOLS
BASED ON THE PACKET METADATA, THE PROTOCOLS AND RESPECTIVE
OFFSETS SEPARATELY INCLUDED IN FOUR PORTIONS OF THE PACKET,
EACH PORTION SEPARATELY RELATED TO RESPECTIVE LAYERS OF
HIERARCHY LAYERS OF A PROTOCOL STACK
906
          │
CALCULATE ADJUSTMENTS TO THE FOUR PORTIONS TO CAUSE
CORRECTIONS TO AT LEAST ONE OF THE FOUR PORTIONS
908
          │
ADJUST THE SCHEDULED TRANSMISSION OF THE PACKET BASED ON THE
CORRECTIONS.
910
```

FIG. 9

**Storage Medium *1000***

*Computer Executable Instructions for 900*

*FIG. 10*

TECHNIQUES FOR PACKET TRANSMIT SCHEDULING

TECHNICAL FIELD

Descriptions are generally related to scheduling packets for transmission from a computing platform.

BACKGROUND

A computing platform such as a server coupled to a network may include a network interface card (NIC) having circuitry or logic to schedule transmission of packets of data from the server. The server may be included as part of a communication network or part of a large data center. In some examples, the server may be deployed in a base station or Node B (e.g., base station transceiver (BTS)) or in other network access roles and often may need to "tunnel" or encapsulate traffic flows to different destinations using a variety of packet header formats. Receivers or intermediary transit points of tunneled or encapsulated traffic flows may receive these traffic flows with one or more of the original packet headers removed or replaced by intervening processing functions. Furthermore, some of these receivers or intermediaries may track or "police" the rates at which they receive traffic from a given sender as part of enforcing service level agreements (SLAs), general network and/or equipment performance measurement and management, or other reasons. Different receivers or intermediaries may therefore measure received/transited traffic rates differently, both because the packet headers themselves may be removed or replaced by intervening processing functions and because the receiver or intermediary transit point may include different amount of received header data or other overhead when measuring received rates. Applications sending traffic in this environment may therefore need traffic shaping capabilities that account for different amount of header or other overhead at different shaping hierarchy levels to account for the different ways that transit points and receivers may be measuring traffic rates.

BRIEF DESCRIPTION OF THE DRAWINGS

FIG. 4 illustrates an example table.
FIG. 5 illustrates an example interpacket gap table.
FIG. 7 illustrates an example scheme.
FIG. 9 illustrates an example logic flow.
FIG. 10 illustrates an example storage medium.

DETAILED DESCRIPTION

In some examples, a server or computing platform may include network interface circuitry such as, but not limit to, a network interface card (NIC). The NIC may include logic and/or features to perform at least some speculative analysis associated with scheduling transmission of packets from the server or computing platform over a network. The logic and/or features of the NIC, in some instances, may have to schedule transmission of packets having multiple packet headers of various sizes associated with respective hierarchy layers of a protocol stack. Packet headers for these packets may vary in size due to protocol differences between hierarchy layers of the protocol stack. For example, the hierarchy layers may be associated with the Open Systems Interconnection (OSI) model. For the OSI model, a first header or content associated with a first physical (PHY) layer may include an interpacket gap (IPG) and a preamble that is a first size, a second header or content associated with a second data link or medium access control (MAC) layer may include an Ethernet header or content that is a second size, a third header or content associated with a third network layer may include internet protocol (IP) content that is a third size, or a fourth header or content associated with a fourth transport layer may include a transmission control protocol (TCP) content that is a fourth size.

According to some examples, a NIC scheduling packets for a server hosting BTS or other types of communication applications may have to schedule packets having headers or content, depending on the layer, that may or may not have a significant impact on an amount of bandwidth needed to transmit these scheduled packets. Different receivers or intermediaries may measure received/transmitted traffic rates differently when determining service level agreement (SLA) conformance, both because the packet headers themselves may be removed or replaced by intervening processing functions and because the receiver or intermediary transmit point may include a different amount of received header data or other overhead when measuring received rates (e.g. perhaps because it operates at a potentially different protocol layer). These SLA requirements may require that a given shaped traffic rate be met when transmitting packets associated with a given hierarchy layer. Thus, a need exists to consider what impact the different header or content sizes may have on packets to be scheduled for transmission and then adjust the content or header sizes accounted for in the rate shaping mechanism prior to transmission to increase a likelihood that SLA requirements are met. Because the SLA requirements may be established per hierarchy layer of traffic shaper, distinct shaping or adjusting of header or content sizes may be needed to enable the NIC per shaping hierarchy level "node".

Figure 1:
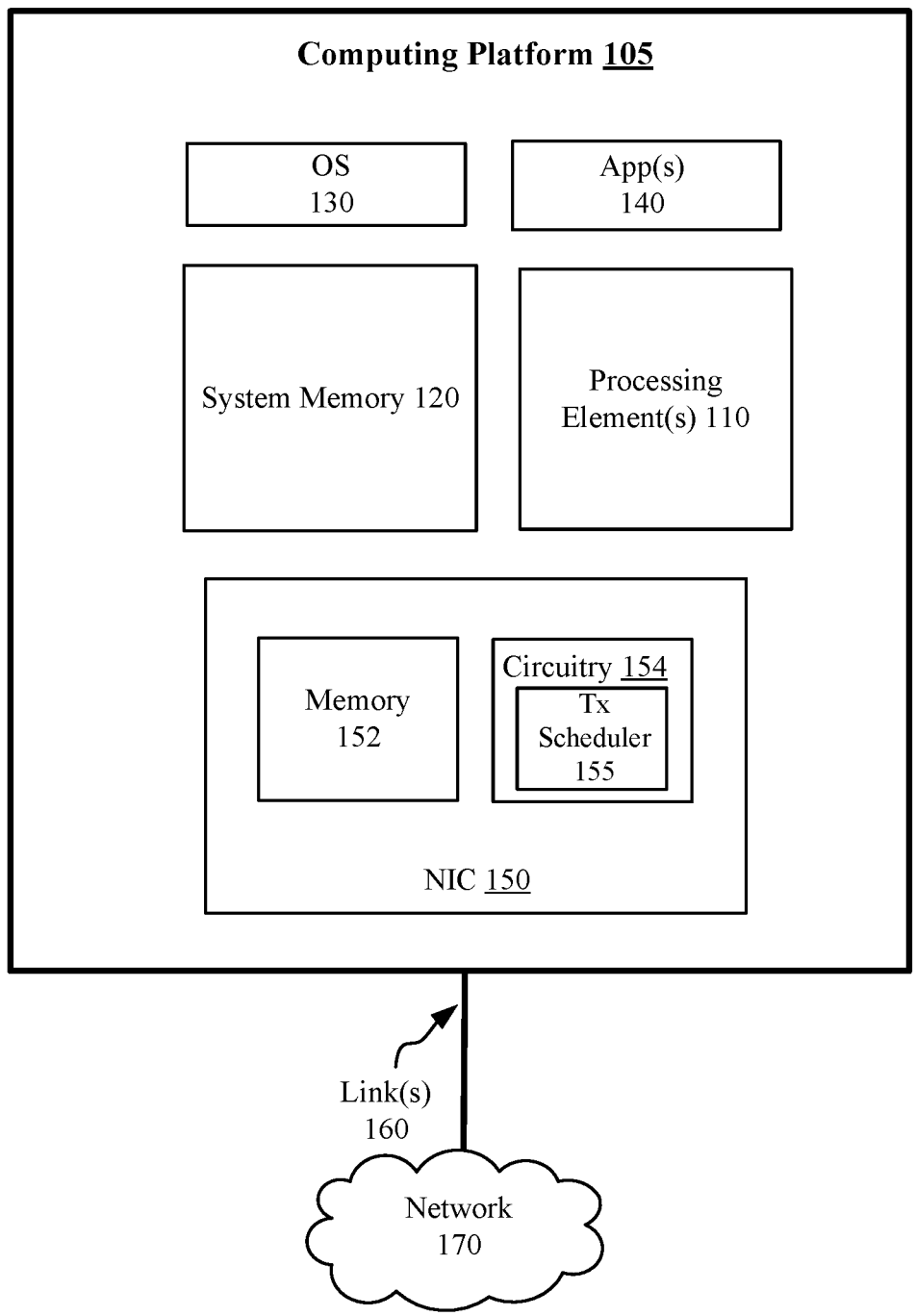
FIG. 1 illustrates an example first system.

FIG. 1 illustrates an example system 100. In some examples, as shown in FIG. 1, system 100 includes a computing platform 105 coupled with a network 170 via one or more links 160. Also, as shown in FIG. 1, computing platform 105 may include processing element(s) 110, a system memory 120, an operating system (OS) 130, one or more applications (App(s)) 140 or a NIC 150.

According to some examples, NIC 150 includes circuitry 154 to support a transmit (Tx) scheduler 155 to facilitate scheduling of a packet to be transmitted from computing platform 105 via link(s) 160. For these examples, packet data for packets to be scheduled for transmission may be pulled from system memory 120 and at least temporarily stored at a memory 152 at NIC 150. Memory 152, in some examples, may include a plurality of transmission queues to at least temporarily store packets scheduled for transmission. As described more below, Tx scheduler 155 may include logic and/or features to make multiple adjustments to various portions of the packet at different levels of the shaping hierarchy. Different application flows may configure different adjustment amounts for their use of a given shaping hierarchy level (so the adjustment may be distinct per shaping "node"). These adjustments may facilitate efficient scheduling of packet to be transmitted from computing platform 105 via link(s) 160.

In some examples, elements of NIC 150, link(s) 160, or network 170 may utilize protocols and/or interfaces according to one or more Ethernet standards promulgated by the Institute of Electrical and Electronics Engineers (IEEE). For example, one such Ethernet standard promulgated by IEEE may include IEEE 802.3-2018, Carrier sense Multiple access with Collision Detection (CSMA/CD) Access Method and Physical Layer Specifications, Published in August 2018 (hereinafter "the IEEE 802.3 specification"). Although examples are not limited to protocols and/or interface used in accordance with the IEEE 802.3 specification, other or additional standards or specification may be utilized.

According to some examples, computing platform 105 may be arranged as part of a server, a server array or server farm, a server for a base transceiver station (BTS), a web server, a network server, an Internet server, a work station, a mini-computer, a main frame computer, a supercomputer, a network appliance, a web appliance, a distributed computing system, multiprocessor systems, processor-based systems, or combination thereof.

In some examples, processing element(s) 110 or circuitry 154 of NIC 150 may include various commercially available processors, including without limitation an AMD® Epyc®, Ryzen®, Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon® or Xeon Phi® processors; and similar processors. According to some examples, processing element(s) 110 or circuitry 154 may also include an application specific integrated circuit (ASIC) and at least some elements, logic and/or features of processing element(s) 110 or circuitry 154 may be implemented as hardware elements of an ASIC. According to some examples, processing element(s) 110 or circuitry 154 may also include a field programmable gate array (FPGA) and at least some elements, logic and/or features of processing element(s) 110 or circuitry 154 may be implemented as hardware elements of an FPGA.

According to some examples, system memory 120 may be composed of one or more memory devices or dies which may include various types of volatile and/or non-volatile memory. Also, memory 152 at NIC 150 may also include one or more memory devices or dies which may include various types of volatile and/or non-volatile memory. Volatile memory may include, but is not limited to, random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM). Non-volatile memory may include, but is not limited to, non-volatile types of memory such as three-dimensional (3-D) cross-point memory. The non-volatile types of memory may be byte or block addressable and may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

Figure 2:
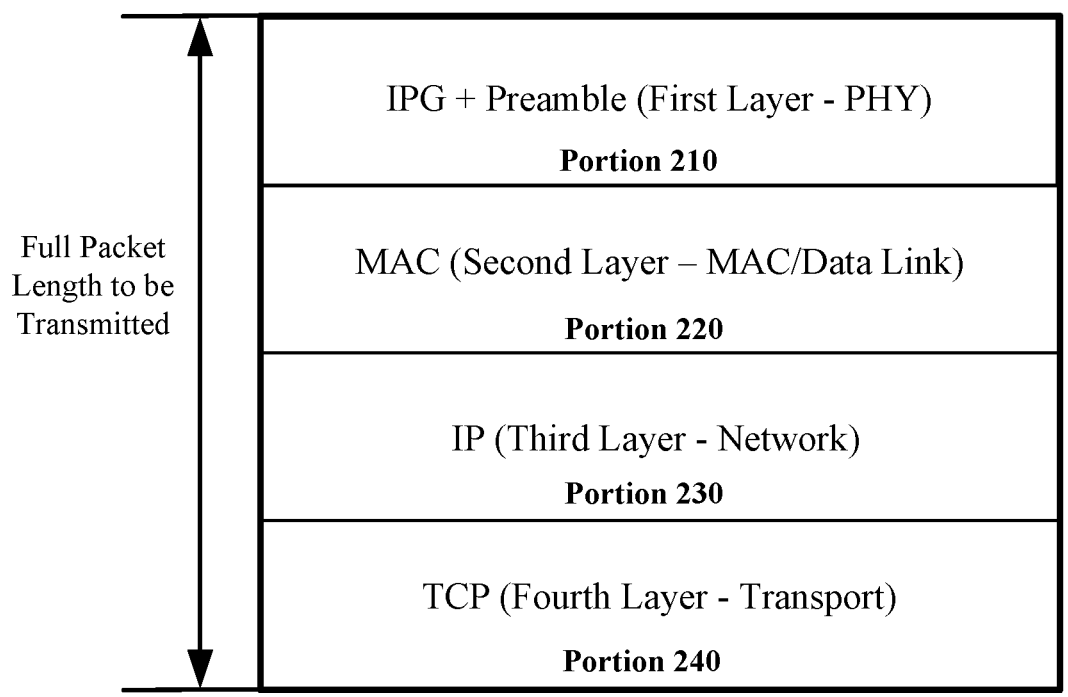
FIG. 2 illustrates an example packet.

FIG. 2 illustrates an example packet 200. According to some examples, packet 200 may include example portions of a packet to be transmitted from a computing platform such as computing platform 105 shown in FIG. 1. For these examples, as shown in FIG. 1, portions 210, 220, 230 and 240 may be related to respective hierarchy layers of a protocol stack. The respective hierarchy layers may be associated with the OSI model. For example, portion 210 may be related to a PHY first layer, portion 220 may be related to a MAC/data link second layer, portion 230 may be related to network third layer and portion 240 may be related to a transport fourth layer. Examples are not limited to the OSI model for a protocol stack, other models may apply that include use of a hierarchy of layers for a protocol stack.

In some examples, as shown in FIG. 2, portions 210 to 240, when combined, may represent a total or full length of a packet to be transmitted from a computing platform. For example, a full length of a packet to be transmitted from computing platform 105 via link(s) 160 to a destination located within network 170. Packet 200, in some examples, may be transmitted in accordance with one or more Ethernet standards such as the IEEE 802.3 specification.

According to some examples, as shown in FIG. 2, portion 210 includes an IPG and a preamble. For these examples, the IPG and preamble may be related to a first layer or PHY. As mentioned more below, the IPG may establish a minimum time interval between transmission of successive packets. The preamble may include PHY specific information that may be added at time of transmission to facilitate receiving of a transmitted packet 200.

In some examples, as shown in FIG. 2, portion 220 includes a MAC (medium/media access control). For these examples, the MAC may be related to a second layer or MAC/data link layer. The MAC may include MAC destination/source information and other types of second layer related content. According to some examples, portions 220, 230 and 240 of packet 200 may include packet data stored to system memory 120 prior to the scheduling of packet 200. These portions of packet 200 may be referred to as a host memory packet length as it reflects that actual portion of a packet stored to a system memory (e.g., system memory 120) prior to being sent to a NIC and then scheduled for transmission from a queue included in a memory at the NIC (e.g., memory 152). Also, the combined portions 220, 230 and 240 may be considered as an L2 length of packet 200 based on the inclusion of second layer as well as third and fourth layers. As mentioned more below, the L2 length may be applicable to determine whether or not a packet needs to be padded to meet minimum packet size requirements. In some examples, cyclic redundancy control (CRC) may also be considered as part of the L2 length.

According to some examples, as shown in FIG. 2, portion 230 includes an IP. For these examples, the IP may be related to a third layer or network layer. The IP may include either internet protocol version 4 (IPv4) content or internet protocol version 6 (IPv6) content. In some examples, the IPv4 or IPv6 content included in portion 230 may include an L3 IP header+an L3 IP payload. Also, when used, an IP security (IPsec) encapsulating security payload (ESP) trailer may be included in portion 230.

In some examples, as shown in FIG. 2, portion 240 includes a TCP. For these examples, the TCP may be related to a fourth layer or transport layer. Examples are not limited to a TCP related to a fourth layer (L4) or transport layer. Other types of L4 or transport layer protocols may be included. The other types of L4 or transport layer protocols may include, but are not limited to, internet control message protocol (ICMP), user datagram protocol (UDP) or stream control transmission protocol (SCTP). According to some examples, portion 240 may also include a data payload for packet 200.

Figure 3:
FIG. 3 illustrates an example format.

FIG. 3 illustrates an example format 300. In some examples, format 300 may be an example format to show the various content or headers associated with or related to hierarchy layers of a protocol stack. For example, PHY content 310 may be related to a first layer, MAC content 320 may be related to a second layer, IPv4 content 330 may be related to a third layer, and TCP header 340 may be related to a fourth layer. Also, payload 350 may be related to the fourth layer as well. In other words, PHY content 310 may be similar to portion 210 of packet 200 shown in FIG. 2, MAC content 320 may be similar to portion 220, IP content 330 may be similar to portion 230 and TCP header 340/payload 350 may be similar to portion 240.

According to some examples, adjustments may be made to content or headers included in example format 300 to facilitate scheduling of transmission of a packet. As described more below, these adjustments may be based, at least in part, on identified profile priorities that may rank each hierarchy layer in terms of importance. The adjustments may include predetermined or default offsets for one or more of the headers and/or packet structure for the entire packet or portions of the packet.

FIG. 4 illustrates an example table 400. In some examples, table 400 may include a list of four configurable protocol priority lists that may rank different priorities for various operator identifiers (IDs). The various operator IDs may be associated with different sources and/or destinations of packets to be transmitted. The different sources and/or destination associated with operator IDs may be for types of applications, types of users, types of customers, etc. According to some examples, a given operator ID may be assigned to be transmitted from one or more assigned Tx queues at a NIC or may be assigned to a given packet type. As mentioned more below, Tx queue context information for a packet to be transmitted may include an indication of an operator ID.

In some examples, operator IDs may separately include four configurable protocol priorities that may be ranked to indicate relative priorities. As shown in FIG. 4 for table 400, the four configurable protocol priorities may include data, MAC, network and transport priority ranks for respective operator IDs 401-1 to 401-n, where "n" may represent any positive, whole integer greater than 2. For these examples, based on an operator ID's protocol priorities a given offset and packet structure recipe may be used to calculate adjustments to cause corrections to one or more portions of a packet being scheduled for transmission. As described in more detail below, the calculated adjustments may cause one or more corrections to portions of the packet related to hierarchy layers of a protocol stack such as portions 210, 220, 230 or 240 as mentioned above for packet 200. For example, offset & packet structure recipe 405 may be based on operator ID 401-1's protocol priorities that place a highest rank for data throughput and a lowest rank for a network layer of the protocol stack. As a result of these priorities, calculated adjustments may be made to cause an increase in data bandwidth (e.g., more data with smaller headers and/or less padding) and less emphasis may be placed on adjustments to cause corrections to a network (e.g., IP) layer of the packet.

According to some examples, if an Operator ID is not available or was not identified, a set of default protocol priorities may be used. For example, as shown in FIG. 4, default protocol priorities for data, MAC, network and transport may have default rankings of 1, 2, 3 and 4, respectively. These default rankings may result in use of offset & packet structure recipe 420 to calculate adjustments.

FIG. 5 illustrates an example IPG table 500. In some examples, as shown in FIG. 5, IPG table 500 may include a list of interpacket gaps (IPGs) for port IDs 501-1 to 501-m, where "m" is any whole, positive integer greater than 6. As mentioned above for packet 200 and example format 300, IPGs may be included in a portion of a packet to be transmitted related to a PHY or first layer of hierarchy layers of a protocol stack. A given IPG for a port ID may be based, at least in part, on a minimum idle period between transmission of packets from a physical port of a NIC coupled to a network. A relatively smaller sized IPG for a given port may indicate higher data transmission rates from the given port. For example, port ID 501-3's IPG of 1 byte may indicate a data transmission rate capability of up to 100 gigabits/second (Gbs). As mentioned more below, IPGs for a port ID may be included in corrections to be made to a packet scheduled for transmission from a NIC coupled to a network.

Figure 6:
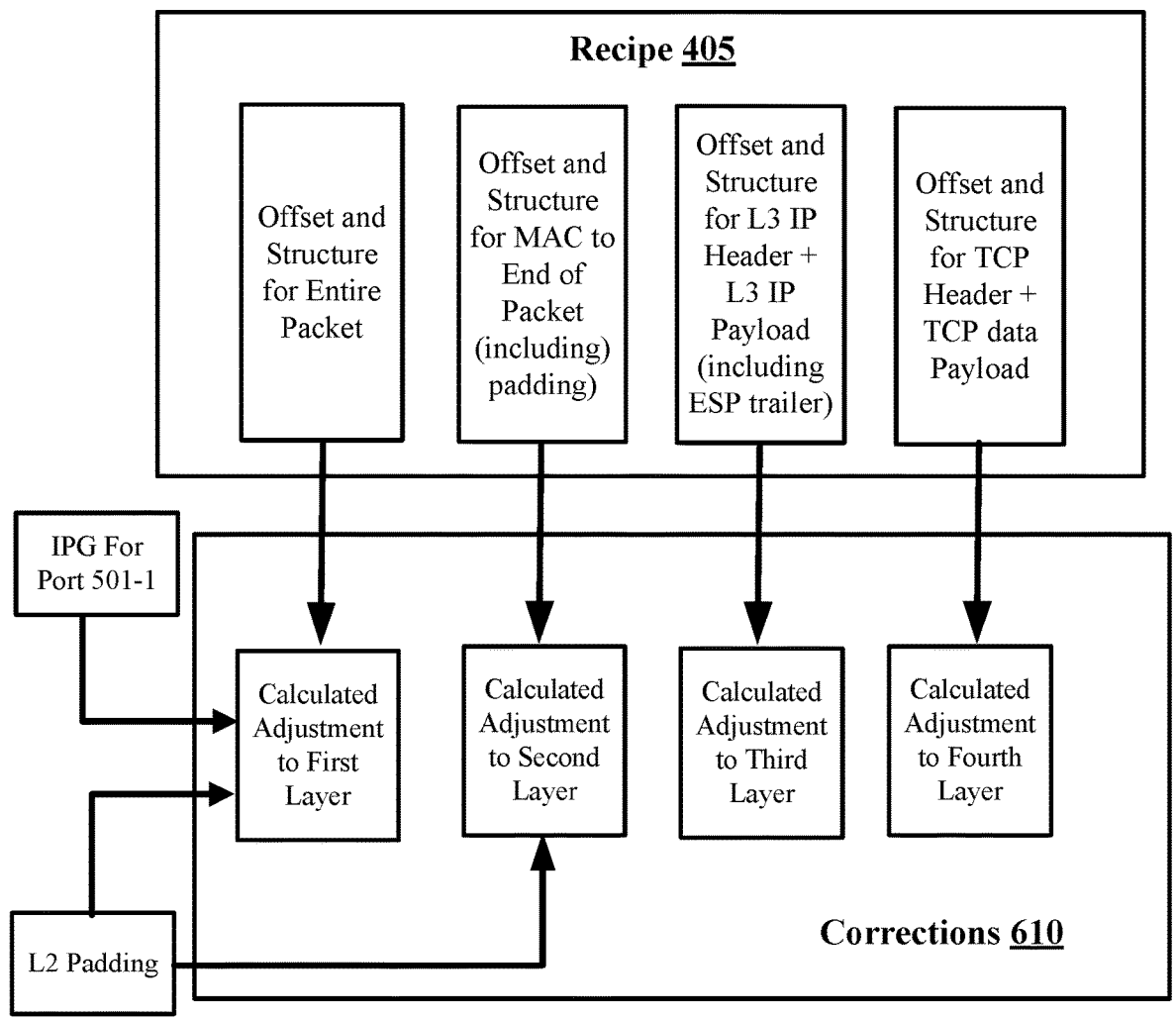
FIG. 6 illustrates an example first process.

FIG. 6 illustrates an example process 600. According to some examples, process 600 depicts an example process of how recipe 405 and other adjustments (e.g., IPG and L2 padding) may be applied to calculate adjustments to different hierarchy layers of a protocol stack to provide corrections 610. As mentioned above for FIG. 4, recipe 405 may be used for Operator ID 401-1. For example, offset and structure for an entire packet scheduled for transmission as well as IPG (e.g., for port 501-1) and L2 padding may be calculated to adjust a first layer. Also, offset and structure for a MAC portion of the packet to the end of the packet (including L2 padding) may be calculated to adjust a second layer. Also, offset and structure for an L3 IP header plus L3 IP payload (including an ESP trailer) may be calculated to adjust a third layer. Also, offset and structure for a TCP header plus a TCP data payload may be calculated to adjust a fourth layer. Following these calculated adjustments, corrections 610 may be provided to logic and/or features of a NIC that schedule transmission of a packet.

FIG. 7 illustrates an example scheme 700. In some examples, scheme 700 may illustrate an example of how corrections 610 may be applied to a transmit scheduling tree 720. For these examples, portions of packet 200 include separate patterns to show how hierarchy layers of a protocol stack relate to transmit scheduling tree 720.

According to some examples, nodes of transmit scheduling tree 720 including a same pattern represent a node or group of nodes targeted for all or portions of packet 200. For example, adjustment 722 of corrections 610 may be made to impact scheduling of packet 200 to groups of nodes that may be part of a network hop and adjustments to all of packet 200 may be of interest to determine bandwidth calculations. Adjustment 724 may be made to impact scheduling of packet 200 to groups of nodes interested in second layer or L2 packet traits of packet 200. Adjustment 726 may be made to impact a node interested in third layer or L3 packet traits of packet 200. Adjustment 728 may be made to impact scheduling of packet 200 to groups of nodes interested in fourth layer traits of packet 200.

Figure 8:
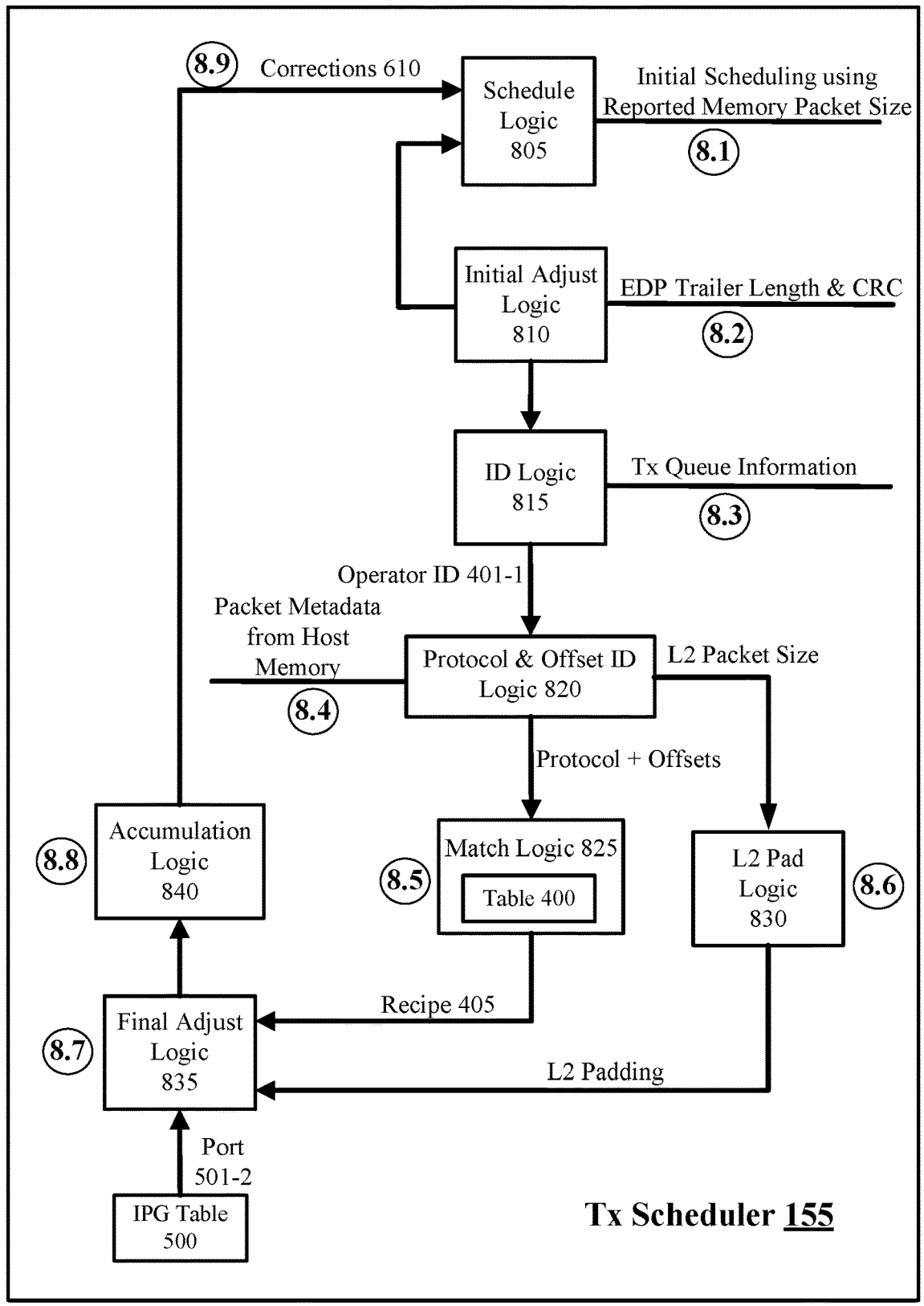
FIG. 8 illustrates an example second process.

FIG. 8 illustrates an example process 800. According to some examples, process 800 may be implemented by logic and/or features of Tx scheduler 155. As mentioned above and shown in FIG. 1, Tx scheduler 155 may be supported by circuitry 154 included in NIC 150 coupled with computing platform 105. For these examples, as shown in FIG. 8, Tx scheduler 155 includes a schedule logic 805, an initial adjust logic 810, an ID logic 815, a protocol & offset ID logic 820, a match logic 825, an L2 pad logic 830, a final adjust logic 835 and an accumulation logic 840. Examples are not limited to the logic shown in FIG. 8, more or less logic and/or features of a Tx scheduler 155 may be utilized to facilitate scheduling of a packet to be transmitted from computing platform 105.

Process 800 begins at 8.1 where schedule logic 805 may initially schedule a packet to be transmitted from computing platform 105 using a packet size reported by an application causing the packet to be transmitted. In some examples, the application may report the packet size in a doorbell to NIC 150/Tx scheduler 155 or the packet size may be reported based on a pre-configured queue used for transmitting scheduled packets for the application. In some examples, the packet size may be an L2 packet size.

Moving to 8.2, an initial adjust logic 810 may cause an initial adjustment to the scheduled packet based on descriptor data associated with the packet. In some examples the descriptor data may indicate an ESP trailer length and a cyclic redundancy check (CRC) that may cause some initial adjustment to the scheduled packet. For example, the packet may have been initially scheduled to be transmitted via a first port coupled to link(s) 160. The initial adjustment may cause the packet to be scheduled for transmission via a second port coupled to link(s) 160 that has a greater data bandwidth capability to handle the additional ESP trailer length and the CRC. Without this initial adjustment, SLAs associated with minimum data bandwidth requirements for transmitting the packet may have not been met using the first port.

Moving to 8.3, ID logic 815 may use Tx queue information to identify an operator ID for the packet. According to some examples, the operator ID may be assigned to a given Tx queue and selection of the given Tx queue for transmission of the packet may enable ID logic 815 to identify the operator ID. For these examples, as shown in FIG. 8, the operator ID is identified as operator ID 401-1.

Moving to 8.4, protocol & offset ID logic 820 may receive packet metadata that has been retrieved from host memory (e.g., system memory 120) and was parsed from packet data by a Tx parser (not shown). In some examples, the packet metadata may be used by protocol & offset ID logic 820 to identify what protocols and offsets for these respective protocols are included in the packet scheduled for transmission. For these examples, the identified protocols may be for hierarchy layers of a protocol stack. For example, PHY protocols, MAC protocols, IP protocols or TCP protocols. Protocol & offset ID logic 820 may also determine an L2 packet size.

Moving to 8.5, match logic 825 may use table 400 that includes a list of four configurable protocol priority lists to see if a match for operator ID 401-1 is found in table 400. In some examples, operator ID 401-1 is located in table 400 and table 400 indicates an offset and packet structure recipe 405 for operator ID 401-1. Offset and packet structure recipe 405 is then used to calculate adjustments to portions of the packet based, at least in part, on protocol priorities.

Moving to 8.6, L2 pad logic 830 may calculate any needed L2 padding for the packet. For example, if the packet is an Ethernet IPv4 packet smaller than 64 bytes, then the L2 padding would need to adjust the packet to have a size of at least 64 bytes. If the packet is an Ethernet IPv6 packet smaller than 84 bytes, the L2 padding would need to adjust the packet to a size of at least 84 bytes. Examples are not limited to IPv4 or IPv6 L2 padding. Other types of padding to cause the packet to reach at least a minimum packet size requirement are contemplated.

Moving to 8.7, final adjust logic 835 may use recipe 405 and L2 padding (if needed) to calculate final adjustments to the packet scheduled for transmission. For some examples, an IPG based on port 501-2 may be provided from IPG table 500. This IPG for port 501-2 may also be used to calculate final adjustments. For these examples, process 600 as shown in FIG. 6 may be followed to calculate the final adjustments that may cause corrections 610 to one or more hierarchy layers of a protocol stack for the packet scheduled for transmission from computing platform 105.

Moving to 8.8, accumulation logic 840 may accumulate the calculated adjustments for the one or more hierarchy layers of the protocol stack as corrections 610.

Moving to 8.9, accumulation logic 840 may forward corrections 610 to schedule logic 805. Schedule logic 805 may then make the final adjustments to the packet based on corrections 610. The final adjustments may cause changes to the initial scheduling of the packet due to possible packet size expansions or reductions caused by corrections 610 to one or more hierarchy layers of a protocol stack for the packet scheduled for transmission from computing platform 105. Process 800 then comes to an end.

FIG. 9 illustrates an example logic flow 900. Logic flow 900 may be representative of some or all of the operations executed by one or more logic, features, or devices described herein, such as Tx scheduler 155. More particularly, logic flow 900 may be implemented by schedule logic 805, protocol & offset ID logic 820, final adjust logic 835 or accumulation logic 840.

According to some examples, logic flow 900 at block 902 may schedule transmission of a packet from a computing platform. For these examples, the computing platform may be computing platform 105 coupled with NIC 150 and schedule logic 805 of Tx scheduler 155 may schedule transmission of the packet.

In some examples, logic flow 900 at block 904 may receive packet metadata for the packet. For these examples, protocol & offset ID logic 820 may receive the packet metadata that was parsed from packet data.

According to some examples, logic flow 900 at block 906 may identify protocols and respective offsets of the protocols based on the packet metadata, the protocols and respective offsets separately included in four portions of the packet, each portion separately related to respective layers of hierarchy layers of a protocol stack. For these examples, protocol & offset ID logic 820 may identify the protocols and respective offsets of the protocols.

In some examples, logic flow 900 at block 908 may calculate adjustments to the four portions to cause corrections to at least one of the four portions. For these examples, final adjust logic 835 may calculate the adjustments to the four portions.

According to some examples, logic flow 900 at block 910 may adjust the scheduled transmission of the packet based on the corrections. For these examples, accumulation logic 840 may accumulate the corrections made by final adjust logic 835 and forward the corrections to schedule logic 805 for schedule logic 805 to adjust the scheduled transmission.

FIG. 10 illustrates an example storage medium 1000. In some examples, storage medium 1000 may be an article of manufacture. Storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
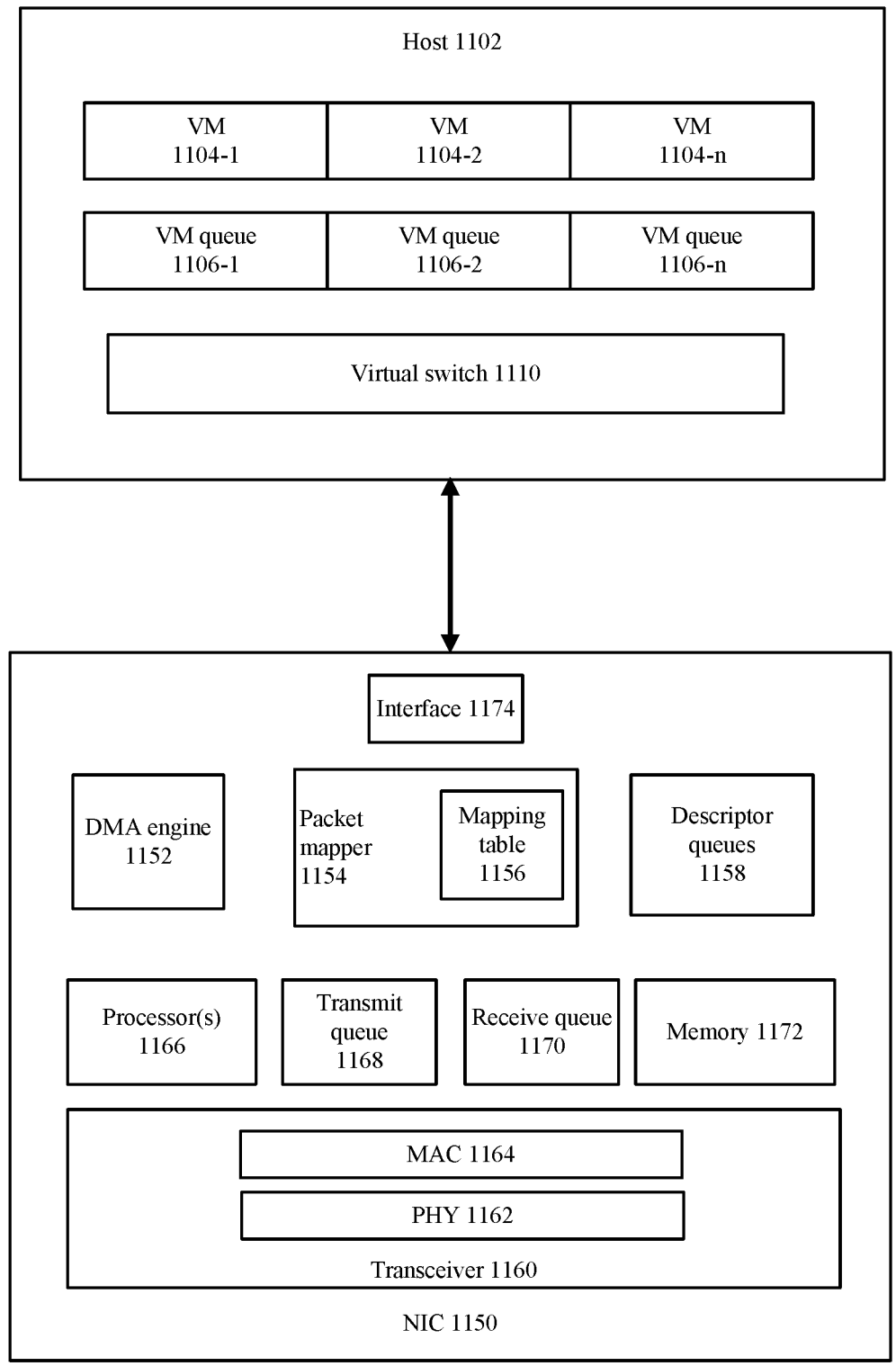
FIG. 11 illustrates an example second system.

FIG. 11 illustrates and example system 1100. In some examples, as shown in FIG. 11, system 1100 may include a host 1102. Host 1102 may be any computing platform with compute, interconnect, memory, storage, and network resources (not shown). For example, host 1102 may include one or more processors, interconnects, one or more memory, one or more storage devices, and one or more network interfaces. Host 1102 may support one or more virtual machines (VMs) 1104 to 1104-*n*. VMs 1104-1 to 1104-N may be any VM supported by host 1102. Also, VM queues 1106-1 to 1106-*n* may be associated with respective VMs 1104-1 to 1104-N and may be included in memory resources maintained by host 1102.

According to some examples, for a packet transmission, virtual switch 1110 may detect that a transmit packet and/or descriptor is formed in a VM queue and a virtual switch 1110 supported by host 1102 may request the packet header, payload, and/or descriptor be transferred to a NIC 1150 using a direct memory access (DMA) engine 1152 located at NIC 1150. For these examples, descriptor queues 1158 may receive the descriptor for the packet to be transmitted. NIC 1150 may transmit the packet. For example, a packet may have a header that identifies the source of the packet, a destination of the packet, and routing information of the packet. A variety of packet protocols may be used, including, but not limited to Ethernet, FibreChannel, Infiniband, or Omni-Path. Host 1102 may transfer a packet to be transmitted from a VM queue from among VM queues 1106-1 to 1106-*n* to NIC 1150 for transmission without use of an intermediate queue or buffer.

In some examples, a virtual switch 1110 supported by host 1102 may monitor properties of the transmitted packet header to determine if those properties are to be used to cause an update to a mapping table 1156 or add a mapping in mapping table 1156. According to some examples, to program a mapping table, a source IP address of a packet may be transmitted from VM 1104-1. For these examples, a mapping is created in mapping table 1156 between that source IP address and VM queue 1106-1 is assigned for that mapping. A packet received by NICT 1150 with a destination IP address equal to the value of the source IP address of VM 1104-1 is placed in mapped VM queue 1106-1. Also, for these examples, the source IP address is used to program the mapping, but it is the destination IP address that is an inspected characteristic or property of packets received on the network card, to determine where to route these packets. Thereafter, a received packet having a property or properties that match the mapping rule is transferred from network interface 1150 to VM queue 1106-1 using DMA engine 1152. For example, if VM 1104-1 requests packet transmission from a source IP address of 2.2.2.2, and if no mapping rule for VM 1104-1 is in mapping table 1156, then virtual switch 1110 may add a mapping of a received packet with a destination IP address of 2.2.2.2 to VM queue 1106-1, which is associated with VM 1104-1.

Virtual switch 1110 may be any software and/or hardware device that provides one or more of: visibility into inter-VM communication; support for Link Aggregation Control Protocol (LACP) to control the bundling of several physical ports together to form a single logical channel; support for standard 802.1Q VLAN model with trunking; multicast snooping; IETF Auto-Attach SPBM and rudimentary required LLDP support; BFD and 802.1ag link monitoring; STP (IEEE 802.1D-1998) and RSTP (IEEE 802.1D-2004); fine-grained QoS control; support for HFSC qdisc; per VM interface traffic policing; network interface bonding with source-MAC load balancing, active backup, and L4 hashing; OpenFlow protocol support (including many extensions for virtualization), IPv6 support; support for multiple tunneling protocols (GRE, VXLAN, STT, and Geneve, with IPsec support); support for remote configuration protocol with C and Python bindings; support for kernel and user-space forwarding engine options; multi-table forwarding pipeline with flow-caching engine; and forwarding layer abstraction to ease porting to new software and hardware platforms. A non-limiting example of virtual switch 1110 is Open vSwitch (OVS), described at https://www.openvswitch.org/.

An orchestrator, cloud operating system, or hypervisor (not shown) may be used to program virtual switch 1110. For example, OpenStack, described at https://www.openstack.org/can be used as a cloud operating system. The orchestrator, cloud operating system, or hypervisor can be executed on or supported by host 1102 or may be executed on or supported by a different physical computing platform.

According to some examples, for a received packet, NIC 1150 may use packet mapper 1154 to route received packets and/or associated descriptors to a VM queue supported by host 1102. Descriptor queues 1158 may be used to store descriptors of received packets. Packet mapper 1154 may use mapping table 1156 to determine which characteristics of a received packet to use to map to a VM queue. A VM queue can be a region of memory maintained by host 1102 that is able to be accessed by a VM. Content maintained or stored in the VM queue may be accessed in first-received-first-retrieved manner or according to any order that a VM requests. For example, a source IP address of 2.2.2.2 specified in a header of a received packet can be associated with VM queue 1106-1 in mapping table 1156. Based on mapping in mapping table 1156, NIC 1150 may use DMA engine 1152 to copy a packet header, packet payload, and/or descriptor directly to VM queue 1106-1, instead of copying the packet to an intermediate queue or buffer.

In some examples, as shown in FIG. 11, NIC 1150 may also include a transceiver 1160, processor(s) 1166, a transmit queue 1168, a receive queue 1170, a memory 1172, and a bus interface 1174. Transceiver 1160 may be capable of receiving and transmitting packets in conformance with applicable protocols such as Ethernet as described in IEEE 802.3, although other protocols may be used. Transceiver 1160 may receive and transmit packets from and to a network via a network medium or link. Transceiver 1160 may include PHY circuitry 1162 and MAC circuitry 1164. PHY circuitry 1162 may include encoding and decoding circuitry (not shown) to encode and decode data packets. MAC circuitry 1164 can be configured to assemble data to be transmitted into packets, that include destination and source addresses along with network control information and error detection hash values. Processors 1166 can be any processor, core, graphics processing unit (GPU), or other programmable hardware device that facilitates programming of NIC 1150. For example, processor(s) 1166 may execute packet mapper 1154. Memory 1172 may be any type of volatile or non-volatile memory device and may at least temporarily store instructions used to program one or more elements of NIC 1150. Transmit queue 1168 may include data or references to data for transmission by NIC 1150. Receive queue 1170 may include data or references to data that was received by NIC 1150. Descriptor queues 1158 may reference data or packets in transmit queue 1168 or receive queue 1170. A bus interface 1174 may provide an interface with host 1102. For example, bus interface 1174 can be compatible with PCI, PCI Express, PCI-x, Serial ATA, and/or USB compatible interface (although other interconnection standards may be used).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The follow examples pertain to additional examples of technologies disclosed herein.

Example 1

An example apparatus may include circuitry at a NIC coupled with a computing platform. The circuitry may schedule transmission of a packet from the computing platform. The circuitry may also receive packet metadata for the packet. The circuitry may also identify protocols and respective offsets of the protocols based on the packet metadata. The protocols and respective offsets may be separately included in four portions of the packet. Each portion may be separately related to respective layers of hierarchy layers of a protocol stack. The circuitry may also calculate adjustments to the four portions to cause corrections to at least one of the four portions and adjust the scheduled transmission of the packet based on the corrections.

Example 2

The apparatus of example 1, the circuitry to schedule transmission of the packet from the computing platform may include the circuitry to initially schedule transmission based on a size of the packet as reported by an application hosted by the computing platform that caused the transmission of the packet from the computing platform.

Example 3

The apparatus of example 2, the circuitry to adjust the scheduled transmission of the packet based on the corrections may include the circuitry to adjust the scheduled transmission responsive to the size of the packet increasing or decreasing based on the corrections to the at least one of the four portions of the packet.

Example 4

The apparatus of example 1, the respective layers of the hierarchy layers of the protocol stack may include a PHY, a MAC layer, a network layer and a transport layer. The PHY, the MAC, the network and the transport layers may be related to respective first, second, third and fourth portions of the four portions of the packet.

Example 5

The apparatus of example 4, the circuitry may also identify an operator ID for a transmit queue at the NIC used to at least temporarily store the packet scheduled for transmission. The circuitry may also determine whether the operator ID matches an operator ID for a protocol priority list that relatively ranks a data priority, a MAC priority, a network priority and a transport priority. The circuitry may also select an offset and packet structure recipe based on the determination and use the offset and packet structure recipe to calculate adjustments to the four portions to cause the corrections to at least one of the four portions.

Example 6

The apparatus of example 5 may also include a memory. The transmit queue at the NIC may be included in the memory.

Example 7

The apparatus of example 5, the first portion related to the PHY layer may include the first portion including an IPG and a preamble for the packet. The circuitry to calculate adjustments to the first portion may include the circuitry to determine an entire packet size when transmitted from the computing platform.

Example 8

The apparatus of example 7, the second portion related to the MAC layer may include the packet formatted as an Ethernet packet. The second portion may include MAC source and MAC destination information. The circuitry to calculate adjustments to the second portion may include the circuitry to determine a packet size for the packet that excludes the IPG and the preamble included in the first portion.

Example 9

The apparatus of example 8, the third portion related to the network layer may include the third portion including IPv4 or IPv6 content. The circuitry to calculate adjustments to the third portion may include the circuitry to determine an offset and structure for an IP header plus IP payload included in the third portion and determine a length of an IPsec ESP trailer to be transmitted with packet.

Example 10

The apparatus of example 9 may also include the circuitry to use descriptor data for the packet to determine the length of the IPsec ESP trailer and determine a length of a CRC. The circuitry may also cause an initial adjustment to the scheduled transmission of the packet based on the determined lengths of the IPsec ESP trailer and the CRC. The initial adjustment may occur prior to the circuitry calculating adjustments to the four portions.

Example 11

The apparatus of example 9, the third portion may include IPv4 content, wherein the circuitry to separately calculate adjustments to the first and second portions includes the circuitry to determine whether padding is needed to meet an IPv4 minimum packet size and then use any needed padding to determine the packet size for an entire packet or to determine the packet size for the packet that excludes the IPG and the preamble.

Example 12

The apparatus of example 8, the fourth portion related to the transport layer may include the fourth portion including TCP content. the circuitry to calculate adjustments to the fourth portion may include the circuitry to determine an offset and structure for a TCP header plus TCP payload included in the fourth portion.

Example 13

An example method may include scheduling, at circuitry for a NIC coupled with a computing platform, transmission of a packet from the computing platform. The method may also include receiving packet metadata for the packet. The method may also include identifying protocols and respective offsets of the protocols based on the packet metadata. The protocols and respective offsets may be separately included in four portions of the packet. Each portion may be separately related to respective layers of hierarchy layers of a protocol stack. The method may also include calculating adjustments to the four portions to cause corrections to at least one of the four portions. The method may also include adjusting the scheduling of the packet based on the corrections.

Example 14

The method of example 13, scheduling transmission of the packet from the computing platform may include initially scheduling transmission based on a size of the packet as reported by an application hosted by the computing platform that caused the transmission of the packet from the computing platform.

Example 15

The method of example 14, adjusting the scheduling of the packet based on the corrections may include adjusting the scheduling responsive to the size of the packet increasing or decreasing based on the corrections to the at least one of the four portions of the packet.

Example 16

The method of example 13, the respective layers of the hierarchy layers of the protocol stack may include a PHY, a MAC layer, a network layer and a transport layer. the PHY, the MAC, the network and the transport layers may be related to respective first, second, third and fourth portions of the four portions of the packet.

Example 17

The method of example 16 may also include identifying an operator ID for a transmit queue at the NIC used to at least temporarily store the packet scheduled for transmission. The method may also include determining whether the operator ID matches an operator ID for a protocol priority list that relatively ranks a data priority, a MAC priority, a network priority and a transport priority. The method may also include selecting an offset and packet structure recipe based on the determination. The method may also include using the offset and packet structure recipe to calculate adjustments to the four portions to cause the corrections to at least one of the four portions.

Example 18

The method of example 16, the first portion related to the PHY layer may include the first portion including an IPG and a preamble for the packet. Calculating adjustments to the first portion may include determining an entire packet size when transmitted from the computing platform.

Example 19

The method of example 18, the second portion related to the MAC layer may include the packet formatted as an Ethernet packet. The second portion may include MAC source and MAC destination information. Calculating adjustments to the second portion may include determining a packet size for the packet that excludes the IPG and the preamble included in the first portion.

Example 20

The method of example 19, the third portion related to the network layer may include the third portion including IPv4 or IPv6 content. Calculating adjustment to the third portion may include determining an offset and structure for an IP header plus IP payload included in the third portion and determining a length of an IPsec ESP trailer to be transmitted with packet.

Example 21

The method of example 20 may also include using descriptor data for the packet to determine the length of the IPsec ESP trailer and determine a length of a CRC. The method may also include causing an initial adjustment to the scheduling of the packet based on the determined lengths of the IPsec ESP trailer and the CRC. The initial adjustment may occur prior to calculating adjustments to the four portions.

Example 22

The method of example 20, the third portion may include IPv4 content. Separately calculating adjustments to the first and second portions may include determining whether padding is needed to meet an IPv4 minimum packet size and then using any needed padding when determining the packet size for an entire packet or when determining the packet size for the packet that excludes the IPG and the preamble.

Example 23

The method of example 19, the fourth portion related to the transport layer may include the fourth portion including TCP content. Calculating adjustments to the fourth portion may include determining an offset and structure for a TCP header plus TCP payload included in the fourth portion.

Example 24

An example at least one machine readable medium may include a plurality of instructions that in response to being executed by a system may cause the system to carry out a method according to any one of examples 13 to 23.

Example 25

An example apparatus may include means for performing the methods of any one of examples 13 to 23.

Example 26

An example system may include a memory that includes transmit queues. The system may also include circuitry. The circuitry may schedule transmission of a packet from a computing platform. The circuitry may also receive packet metadata for the packet. The circuitry may also identify protocols and respective offsets of the protocols based on the packet metadata. The protocols and respective offsets may be separately included in four portions of the packet. Each portion may be separately related to respective layers of hierarchy layers of a protocol stack. The circuitry may also calculate adjustments to the four portions to cause corrections to at least one of the four portions and adjust the scheduled transmission of the packet based on the corrections.

Example 27

The system of example 26, the circuitry to schedule transmission of the packet from the computing platform may include the circuitry to initially schedule transmission based on a size of the packet as reported by an application hosted by the computing platform that caused the transmission of the packet from the computing platform.

Example 28

The system of example 27, the circuitry to adjust the scheduled transmission of the packet based on the corrections may include the circuitry to adjust the scheduled transmission responsive to the size of the packet increasing or decreasing based on the corrections to the at least one of the four portions of the packet.

Example 29

The system of example 27, the respective layers of the hierarchy layers of the protocol stack may include a PHY, a MAC layer, a network layer and a transport layer. The PHY, the MAC, the network and the transport layers may be related to respective first, second, third and fourth portions of the four portions of the packet.

Example 30

The system of example 29 may also include the circuitry to identify an operator ID for a transmit queue from among the transmit queues. The transmit queue may be used to at least temporarily store the packet scheduled for transmission. The circuitry may also determine whether the operator ID matches an operator ID for a protocol priority list that relatively ranks a data priority, a MAC priority, a network priority and a transport priority. The circuitry may also select an offset and packet structure recipe based on the determination. The circuitry may also use the offset and packet structure recipe to calculate adjustments to the four portions to cause the corrections to at least one of the four portions.

Example 31

An example at least one machine readable medium may include a plurality of instructions that in response to being executed by a system at a NIC may cause the system to schedule transmission of a packet from a computing platform coupled with the NIC. The instructions may also cause the system to receive packet metadata for the packet. The instructions may also cause the system to identify protocols and respective offsets of the protocols based on the packet metadata. The protocols and respective offsets separately included in four portions of the packet. Each portion may be separately related to respective layers of hierarchy layers of a protocol stack. The instructions may also cause the system to calculate adjustments to the four portions to cause corrections to at least one of the four portions. The instructions may also cause the system to adjust the scheduled transmission of the packet based on the corrections.

Example 32

The at least one machine readable medium of example 31, the instructions to cause the system to schedule transmission of the packet from the computing platform may include the instructions to cause the system to initially schedule transmission based on a size of the packet as stored in system memory of the computing platform.

Example 33

The at least one machine readable medium of example 32, the instructions to cause the system to schedule transmission of the packet from the computing platform may include the instructions to cause the system to initially schedule transmission based on a size of the packet as reported by an application hosted by the computing platform that caused the transmission of the packet from the computing platform.

Example 34

The at least one machine readable medium of example 31, the respective layers of the hierarchy layers of the protocol stack may include a PHY, a MAC layer, a network layer and a transport layer. The PHY, the MAC, the network and the transport layers may be related to respective first, second, third and fourth portions of the four portions of the packet.

Example 35

The at least one machine readable medium of example 34, the instructions to further cause the system to identify an operator ID for a transmit queue at the NIC used to at least temporarily store the packet scheduled for transmission. The instructions may also cause the system to determine whether the operator ID matches an operator ID for a protocol priority list that relatively ranks a data priority, a MAC priority, a network priority and a transport priority. The instructions may also cause the system to select an offset and packet structure recipe based on the determination. The instructions may also cause the system to use the offset and packet structure recipe to calculate adjustments to the four portions to cause the corrections to at least one of the four portions.

Example 36

The at least one machine readable medium of example 34, the first portion related to the PHY layer may include the first portion including an IPG and a preamble for the packet. The instructions to cause the system to calculate adjustments to the first portion may include the instructions to cause the system to determine an entire packet size when transmitted from the computing platform.

Example 37

The at least one machine readable medium of example 36, the second portion related to the MAC layer may include the packet formatted as an Ethernet packet. The second portion may include MAC source and MAC destination information. The instructions to cause the system to calculate adjustments to the second portion may include the instructions to cause the system to determine a packet size for the packet that excludes the IPG and the preamble included in the first portion.

Example 38

The at least one machine readable medium of example 37, the third portion related to the network layer may include the third portion including IPv4 or IPv6 content. The instructions to cause the system to calculate adjustment to the third portion may include the instructions to cause the system to determine an offset and structure for an IP header plus IP payload included in the third portion and determining a length of an IPsec ESP trailer to be transmitted with packet.

Example 39

The at least one machine readable medium of example 38, the instructions to further cause the system to use descriptor data for the packet to determine the length of the IPsec ESP trailer and determine a length of a CRC. The instructions may also cause the system to cause an initial adjustment to the scheduled transmission of the packet based on the determined lengths of the IPsec ESP trailer and the CRC. The initial adjustment may occur prior to calculating adjustments to the four portions.

Example 40

The at least one machine readable medium of example 38, the third portion including IPv4 content. The instructions to cause the system to separately calculate adjustments to the first and second portions may include the instructions to cause the system to determine whether padding is needed to meet an IPv4 minimum packet size and then use any needed padding when determining the packet size for an entire packet or when determining the packet size for the packet that excludes the IPG and the preamble.

Example 41

The at least one machine readable medium of example 37, the fourth portion related to the transport layer comprises the fourth portion including TCP content. The instructions to cause the system to calculate adjustments to the fourth portion may include the instructions to cause the system to determine an offset and structure for a TCP header plus TCP payload included in the fourth portion.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    scheduling, at circuitry for a network interface card (NIC) coupled with a computing platform, transmission of a packet from the computing platform;
    receiving packet metadata for the packet;
    identifying protocols and respective offsets of the protocols based on the packet metadata, the protocols and respective offsets separately included in four portions of the packet, each portion separately related to respective layers of hierarchy layers of a protocol stack;
    calculating adjustments to the four portions to cause corrections to at least one of the four portions; and
    adjusting the scheduling of the packet based on the corrections.

2. The method of claim 1, scheduling transmission of the packet from the computing platform comprises initially scheduling transmission based on a size of the packet as reported by an application hosted by the computing platform that caused the transmission of the packet from the computing platform.

3. The method of claim 2, adjusting the scheduling of the packet based on the corrections comprises adjusting the scheduling responsive to the size of the packet increasing or decreasing based on the corrections to the at least one of the four portions of the packet.

4. The method of claim 1, the respective layers of the hierarchy layers of the protocol stack comprise a physical (PHY) layer, a medium access control (MAC) layer, a network layer and a transport layer, the PHY, the MAC, the network and the transport layers related to respective first, second, third and fourth portions of the four portions of the packet.

5. The method of claim 4, comprising:
    identifying an operator identifier (ID) for a transmit queue at the NIC used to at least temporarily store the packet scheduled for transmission;
    determining whether the operator ID matches an operator ID for a protocol priority list that relatively ranks a data priority, a MAC priority, a network priority and a transport priority;
    selecting an offset and packet structure recipe based on the determination; and
    using the offset and packet structure recipe to calculate adjustments to the four portions to cause the corrections to at least one of the four portions.

6. An apparatus comprising:
    circuitry at a network interface card (NIC) coupled with a computing platform, the circuitry to:
    schedule transmission of a packet from the computing platform;
    receive packet metadata for the packet;
    identify protocols and respective offsets of the protocols based on the packet metadata, the protocols and respective offsets separately included in four portions of the packet, each portion separately related to respective layers of hierarchy layers of a protocol stack;
    calculate adjustments to the four portions to cause corrections to at least one of the four portions; and
    adjust the scheduled transmission of the packet based on the corrections.

7. The apparatus of claim 6, the circuitry to schedule transmission of the packet from the computing platform comprises the circuitry to initially schedule transmission based on a size of the packet as reported by an application hosted by the computing platform that caused the transmission of the packet from the computing platform.

8. The apparatus of claim 7, the circuitry to adjust the scheduled transmission of the packet based on the corrections comprises the circuitry to adjust the scheduled transmission responsive to the size of the packet increasing or decreasing based on the corrections to the at least one of the four portions of the packet.

9. The apparatus of claim 6, the respective layers of the hierarchy layers of the protocol stack comprise a physical (PHY) layer, a medium access control (MAC) layer, a network layer and a transport layer, the PHY, the MAC, the network and the transport layers related to respective first, second, third and fourth portions of the four portions of the packet.

10. The apparatus of claim 9, further comprising the circuitry to:
    identify an operator identifier (ID) for a transmit queue at the NIC used to at least temporarily store the packet scheduled for transmission;

determine whether the operator ID matches an operator ID for a protocol priority list that relatively ranks a data priority, a MAC priority, a network priority and a transport priority;

select an offset and packet structure recipe based on the determination; and use the offset and packet structure recipe to calculate adjustments to the four portions to cause the corrections to at least one of the four portions.

11. The apparatus of claim 9, further comprising:
a memory, the transmit queue at the NIC included in the memory.

12. The apparatus of claim 9, the first portion related to the PHY layer comprises the first portion including an inter-packet gap (IPG) and a preamble for the packet, wherein the circuitry to calculate adjustments to the first portion includes the circuitry to determine an entire packet size when transmitted from the computing platform.

13. The apparatus of claim 12, the second portion related to the MAC layer comprises the packet formatted as an Ethernet packet, the second portion including MAC source and MAC destination information, wherein the circuitry to calculate adjustments to the second portion includes the circuitry to determine a packet size for the packet that excludes the IPG and the preamble included in the first portion.

14. The apparatus of claim 13, the third portion related to the network layer comprises the third portion including internet protocol version 4 (IPv4) content or internet protocol version 6 (IPv6) content, wherein the circuitry to calculate adjustments to the third portion includes the circuitry to determine an offset and structure for an IP header plus IP payload included in the third portion and determine a length of an IP security (IPsec) encapsulating security payload (ESP) trailer to be transmitted with the packet.

15. The apparatus of claim 14, further comprising the circuitry to:
use descriptor data for the packet to determine the length of the IPsec ESP trailer and determine a length of a cyclic redundancy check (CRC); and
cause an initial adjustment to the scheduled transmission of the packet based on the determined lengths of the IPsec ESP trailer and the CRC, the initial adjustment to occur prior to the logic calculating adjustments to the four portions.

16. The apparatus of claim 14, comprising the third portion including IPv4 content, wherein the logic to separately calculate adjustments to the first and second portions includes the circuitry to determine whether padding is needed to meet an IPv4 minimum packet size and then use any needed padding to determine the packet size for an entire packet or to determine the packet size for the packet that excludes the IPG and the preamble.

17. The apparatus of claim 13, comprising the fourth portion related to the transport layer comprises the fourth portion including transport control protocol (TCP) content, wherein the circuitry to calculate adjustments to the fourth portion includes the logic to determine an offset and structure for a TCP header plus TCP payload included in the fourth portion.

18. At least one non-transitory machine readable medium comprising a plurality of instructions that in response to being executed by a system at a network interface card (NIC) cause the system to:
schedule transmission of a packet from a computing platform coupled with the NIC;
receive packet metadata for the packet;
identify protocols and respective offsets of the protocols based on the packet metadata, the protocols and respective offsets separately included in four portions of the packet, each portion separately related to respective layers of hierarchy layers of a protocol stack;
calculate adjustments to the four portions to cause corrections to at least one of the four portions; and
adjust the scheduled transmission of the packet based on the corrections.

19. The at least one non-transitory machine readable medium of claim 18, the instructions to cause the system to schedule transmission of the packet from the computing platform comprises the instructions to cause the system to initially schedule transmission based on a size of the packet as reported by an application hosted by the computing platform that caused the transmission of the packet from the computing platform.

20. The at least one non-transitory machine readable medium of claim 19, the instructions to cause the system to adjust the scheduled transmission of the packet based on the corrections comprises the instructions to cause the system to adjust the scheduled transmission responsive to the size of the packet increasing or decreasing based on the corrections to the at least one of the four portions of the packet.

21. The at least one non-transitory machine readable medium of claim 18, the respective layers of the hierarchy layers of the protocol stack comprise a physical (PHY) layer, a medium access control (MAC) layer, a network layer and a transport layer, the PHY, the MAC, the network and the transport layers related to respective first, second, third and fourth portions of the four portions of the packet.

22. The at least one non-transitory machine readable medium of claim 21, the instructions to further cause the system to:
identify an operator identifier (ID) for a transmit queue at the NIC used to at least temporarily store the packet scheduled for transmission;
determine whether the operator ID matches an operator ID for a protocol priority list that relatively ranks a data priority, a MAC priority, a network priority and a transport priority;
select an offset and packet structure recipe based on the determination; and
use the offset and packet structure recipe to calculate adjustments to the four portions to cause the corrections to at least one of the four portions.

\* \* \* \* \*